United States Patent
Fujimoto et al.

(10) Patent No.: US 6,615,152 B2
(45) Date of Patent: Sep. 2, 2003

(54) ABNORMALITY DETECTING METHOD AND DEVICE FOR POSITION DETECTING DEVICE, AND ELECTRIC POWER STEERING DEVICE

(75) Inventors: Chiaki Fujimoto, Tokyo (JP); Yukio Fukushima, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/969,724

(22) Filed: Oct. 4, 2001

(65) Prior Publication Data

US 2002/0143450 A1 Oct. 3, 2002

(30) Foreign Application Priority Data

Mar. 27, 2001 (JP) ........................................ 2001-090267

(51) Int. Cl.[7] .............................................. G06F 15/00
(52) U.S. Cl. ........................... 702/94; 702/95; 702/189; 341/116; 701/43; 180/400
(58) Field of Search ............................ 702/94, 95, 104, 702/150, 189, 183, 163; 180/446, 400; 701/43; 318/605, 651; 341/111, 117, 116

(56) References Cited

U.S. PATENT DOCUMENTS 4,715,461 A * 12/1987 Shimizu .................... 180/446

6,029,767 A 2/2000 Kifuku
6,191,550 B1 2/2001 Yoshihara

FOREIGN PATENT DOCUMENTS

| DE | 199 53 606 A1 | 6/2000 |
| EP | 0 800 979 B1 | 5/1999 |
| JP | 09024846 A | 1/1997 |
| JP | 9-72758 | 3/1997 |
| JP | 10181617 A | 7/1998 |
| JP | 11217080 A | 8/1999 |
| JP | 2000-131096 | 5/2000 |

* cited by examiner

Primary Examiner—John Barlow
Assistant Examiner—Hien Vo
(74) Attorney, Agent, or Firm—Sughrue Mion, PLLC

(57) ABSTRACT

In an abnormality detecting device for a position detecting device which generates an amplitude-modulated or phase-modulated signal from a position sensor according to the rotational position of the rotor of a motor when a reference signal having a predetermined periodic waveform is supplied, there are provided a bias current applying unit made of a passage including a resistance of applying DC bias current to an output winding of the position sensor, positional abnormality detecting units for detecting a biased DC signal of an amplitude-modulated or phase-modulated signal applied to the output winding apart from a position detector circuit for detecting the rotational position of the rotor, and an abnormality detection judgment processing part for judging abnormality of the position detecting device from a DC signal detected by the positional abnormality detecting units.

15 Claims, 7 Drawing Sheets

ABNORMALITY DETECTING METHOD AND DEVICE FOR POSITION DETECTING DEVICE, AND ELECTRIC POWER STEERING DEVICE

BACKGROUND OF THE INVENTION

1. Field of the Invention

The present invention relates to an abnormality detecting method and device for a position detecting device which is applicable for both a rotational position and a linear position such as a rotational position detector, for example a resolver or a synchro for detecting a position, or a linear position detector based on the similar detection principle, and an electric power steering device using such a device, and particularly, relates to judgment at the time of abnormality in the position detection of an electric power steering device for assisting a steering effort of a steering wheel by means for a motor, and a processing at that time.

2. Description of the Prior Art

Conventionally, in this kind of position detecting device, a resolver is used as a position detecting sensor, and two orthogonal winding output signals are inputted into a resolver digital converter (R/D converter), and the rotational position is detected. This position detecting device is utilized in the control of rotation of a motor.

FIG. 5 is a block diagram showing a position detecting device disclosed in, for example, Japanese Patent Laid-Open No. 9-72758.

In this drawing, a reference signal that is sine wave voltage for excitation is inputted into the position sensor 1 using a resolver from an oscillator circuit 22. From the position sensor 1, a reference signal is outputted as a signal amplitude-modulated by cos θ and sin θ according to the rotational position θ thereof. Hereafter, an output signal amplitude-modulated by cos θ is a cos signal and an output signal amplitude-modulated by sin θ is a sin signal.

These two output signals are inputted into a position detector circuit 4 using an R/D converter, and from the position detector circuit 4, the rotational position θ is outputted as a digital signal. This digital signal of the rotational position θ is inputted into a control CPU 5, and is used for a predetermined control. In the case where a breaking of the wire is caused in the resolver used as the position sensor 1, it becomes a cause of malfunction in various control mechanisms, and therefore, it is necessary to detect this breaking of the wire of the resolver without delay.

As this kind of conventionally used abnormality detecting method, in the above described Japanese Patent Laid-Open No. 9-72758 or the like, there is disclosed a method in which the amplitude-modulated signals (sin signal, cos signal) of two output parts of the position sensor 1 corresponding to the rotational position that are resolver signals are compared or operated in the control CPU 5 through the A/D converter circuits 23, 24 apart from the position detector circuit 4 for detecting the position, and abnormality is judged in the case where a predetermined condition is not satisfied.

Furthermore, in Japanese Patent Laid-Open No. 2000-131096 shown in FIG. 6, a DC power source 12 is connected to one end of an output winding 3 of the position sensor 1 through a resistance 31, and the other end of the output winding 3 is connected to the ground through a resistance 32, and consequently, DC bias current 15 is applied to the cos signal or sin signal that is amplitude-modulated according to the rotational position, from the output winding 3 of the position sensor 1. Then, signals 6, 7 from the output winding 3 are inputted in a differential amplifier 10 through buffer circuits 8, 9, respectively and are amplified, and abnormality is judged when a signal with a voltage value higher than the maximum voltage value is outputted from the amplified signal.

BRIEF SUMMARY OF THE INVENTION

Object of the Invention

By the way, the conventional abnormality detecting methods disclosed in the above described specification have the following problems.

First, in the above described Japanese Patent Laid-Open No. 9-72758, the structure is made as mentioned above, and therefore, for example, as for the sin signal, it becomes of 0 V when the rotational position is of 0 degree since it is an amplitude-modulated signal, and the judgment cannot be made when the wiring is broken. Furthermore, it is impossible to detect a grounding or air discharge, and it is impossible to judge that it is abnormality.

Furthermore, in the case of the above described Japanese Patent Laid-Open No. 2000-131096, the normal time and abnormal time are judged by detecting the maximum value voltage of the amplified signal from the amplitude-modified signal, and therefore, a circuit for dividing the normal time and the abnormal time by a wind comparator or the like is necessary. Furthermore, it is necessary to input the signal from the output winding 3 of the position sensor 1 to the differential amplifier 10 through the buffer circuits 8, 9. Therefore, there is a tendency of enlarging the circuit scale for detecting the breaking of the wire, which is expensive.

Furthermore, noise is easily generated since the passage of the output winding 3 is usually long, and a resistance 33 is usually arranged between the output parts as shown in FIG. 7, and it is the ordinary course that the high frequency component noise is eliminated by controlling the impedance. However, in the case of the circuit structure of FIG. 6, it is difficult to detect the breaking of the wire because of the bias resistance, that is, the resistances 31, 32 when the above described resistance 33 is arranged between the output parts, and accordingly, the resistance 33 cannot be arranged, and therefore, it is impossible to eliminate the noise.

This invention is made for solving such problems, and it is an object to provide an abnormality detecting method and a device of a position detecting device in which DC bias is applied to the output winding of the position sensor, and the abnormality such as the breaking of the output winding is surely detected, and in the meantime, the DC bias and the reduction of noise in the position detecting can coexist, and the cost is low and the structure is simple, and an electric power steering device.

SUMMARY OF THE INVENTION

The abnormality detecting method of a position detecting device according to the invention of claim 1 is an abnormality detecting method of a position detecting device which generates an amplitude-modulated or phase-modulated signal from a position sensor according to a rotational position of a rotor when a reference signal having a predetermined periodic waveform is supplied, and the method comprises: a step of applying DC bias current to an output winding of the above described position sensor; a step of detecting a biased DC signal of an amplitude-modulated or phase-modulated signal applied to the above described output winding, apart from signal processing for detecting a rotational position of the above described rotor; and a step of judging abnormality of the above described position detecting device from the above described detected DC signal.

According to this configuration, there is such an effect that abnormality of the position detecting device can surely be detected regardless of the rotational position of a rotor, and furthermore, simplification of the circuit structure and reduction of the cost can be attained.

The abnormality detecting method of a position detecting device according to the invention of claim 2 is a method, in which the above described step of detecting the DC signal includes a step of eliminating an amplitude-modulated component or a phase-modulated component produced by noise and a reference signal.

According to this configuration, there is such an effect that abnormality of the position detecting device can surely be detected without being affected by noise coming from the outside or the like.

The abnormality detecting method of a position detecting device according to the invention of claim 3 is a method further comprising a step of judging abnormality of the above described position detecting device from a DC signal depending on only the above described DC bias current, when the above described reference signal is not supplied.

According to this configuration, there is such an effect that the accuracy in abnormality detection of the position detecting device can be improved.

The abnormality detecting method of a position detecting device according to the invention of claim 4 is a method, in which it is judged that the above described position detecting device is abnormal when the state where the above described DC signal is out of a predetermined range continues for a predetermined time, in the above described step of judging abnormality.

According to this configuration, there is such an effect that abnormality of the position detecting device can surely be detected without being affected by noise from the outside or the like.

The abnormality detecting device of a position detecting device according to the invention of claim 5 is an abnormality detecting device of a position detecting device which generates an amplitude-modulated or phase-modulated signal from a position sensor according to a rotational position of a rotor when a reference signal having a predetermined periodic waveform is supplied, and the abnormality detecting device comprises: bias current applying means for applying DC bias current to output winding of the above described position sensor; DC signal detecting means for detecting a biased DC signal of an amplitude-modulated or phase-modulated signal applied to the above described output winding, apart from signal processing means for detecting a rotational position of the above described rotor; and abnormality judging means for judging abnormality of the above described position detecting device from a DC signal detected by the above described DC signal detecting means.

According to this configuration, there is such an effect that abnormality of the position detecting device can surely be detected regardless of the rotational position of the rotor, and furthermore, simplification of the circuit structure and reduction of the cost can be attained.

The abnormality detecting device of a position detecting device according to the invention of claim 6 is a device, in which the above described DC signal detecting means has a filter of eliminating an amplitude-modulated component or a phase-modulated component produced by noise and a reference signal.

According to this configuration, there is such an effect that abnormality of the position detecting device can surely be detected without being affected by noise from the outside or the like.

The abnormality detecting device of a position detecting device according to the invention of claim 7 is a device, in which the above described filter has a time constant larger than an oscillation period of the above described amplitude-modulated or phase-modulated signal.

According to this configuration, there is such an effect that it is possible to contribute the improvement of accuracy in the abnormality detection of the position detecting device.

The abnormality detecting device of a position detecting device according to the invention of claim 8 is a device, in which the above described filter includes a resistance and a capacitor that are connected in series between both ends of the above described output winding and the ground, respectively.

According to this configuration, there is such an effect that noise appearing on the output winding can easily be eliminated, and it is possible to contribute the improvement of accuracy in abnormality detection of the position detecting device.

The abnormality detecting device of a position detecting device according to the invention of claim 9 is a device, in which the above described filter uses either the resistance or the capacitor that is connected in series between both ends of said output winding and the ground for the abnormality detection.

According to this configuration, there is such an effect that it is possible to contribute the improvement of accuracy in abnormality detection of the position detecting device.

The abnormality detecting device of a position detecting device according to the invention of claim 10 is a device, in which the above described bias current applying means includes a passage that leads to the ground from a DC power source through a first resistance, one resistance of the above described filter, the above described output winding, the other resistance of the above described filter, and a second resistance.

According to this configuration, there is such an effect that it is possible to contribute the improvement of accuracy in the abnormality detection of the position detecting device, the simplification of the circuit structure, and the reduction of the cost.

The abnormality detecting device of a position detecting device according to the invention of claim 11 is a device, in which the amount of resistance included in the passage of the above described bias current applying means is set larger than the amount of resistance applied between the above described output winding.

According to this configuration, there is such an effect that abnormality of the position detecting device can surely be detected without giving adverse effects on the amplitude-modulated or phase-modulated signal.

The abnormality detecting device of a position detecting device according to the invention of claim 12 is a device further comprising reference signal generating means capable of controlling generation of a reference signal, in which the above described abnormality judging means judges abnormality of the above described position detecting device from a DC signal depending on only the above described DC bias current, when the above described reference signal is not supplied.

According to this configuration, there is such an effect that accuracy in the abnormality detection of the position detecting device can be improved.

The electric power steering device according to the invention of claim 13 comprises: the abnormality detecting device of a position detecting device according to any one of the above described claims 5 to 11; control means for controlling a controlled object including the above described rotor on the basis of a position signal outputted from the above described position detecting device; and monitoring means for monitoring the control operation of said control means, and it inputs an abnormality detecting signal based on a DC signal obtained by the above described abnormality detecting device directly to the above described control means or the above described monitoring means, and it judges that the above described position detecting device is abnormal when the above described abnormality detecting signal is out of a predetermined range.

According to this configuration, there is such an effect that abnormality of the position detecting device can surely be detected regardless of the rotational position of the rotor, and furthermore, simplification of the circuit structure and reduction of the cost can be attained.

The electric power steering device according to the invention of claim 14 is a device, in which it is judged that the above described position detecting device is abnormal when the state where the above described DC signal is out of a predetermined range continues for a predetermined time.

According to this configuration, there is such an effect that abnormality of the position detecting device can surely be detected without being affected by noise from the outside or the like.

The electric power steering device according to the invention of claim 15 is a device, in which the above described controlled object is a motor of assisting the steering effort of a driver, and driving means for driving the above described motor is provided, and when it is judged from the above described abnormality detecting device that the position detecting device is abnormal, driving control of the above described motor is stopped, and driving of the above described motor is inhibited.

According to this configuration, there is such an effect that malfunction in the motor driving control can surely be stopped.

DETAILED DESCRIPTION OF THE PREFERRED EMBODIMENTS

Embodiments of this invention will be described below on the basis of the drawings.
Embodiment 1

Figure 1:
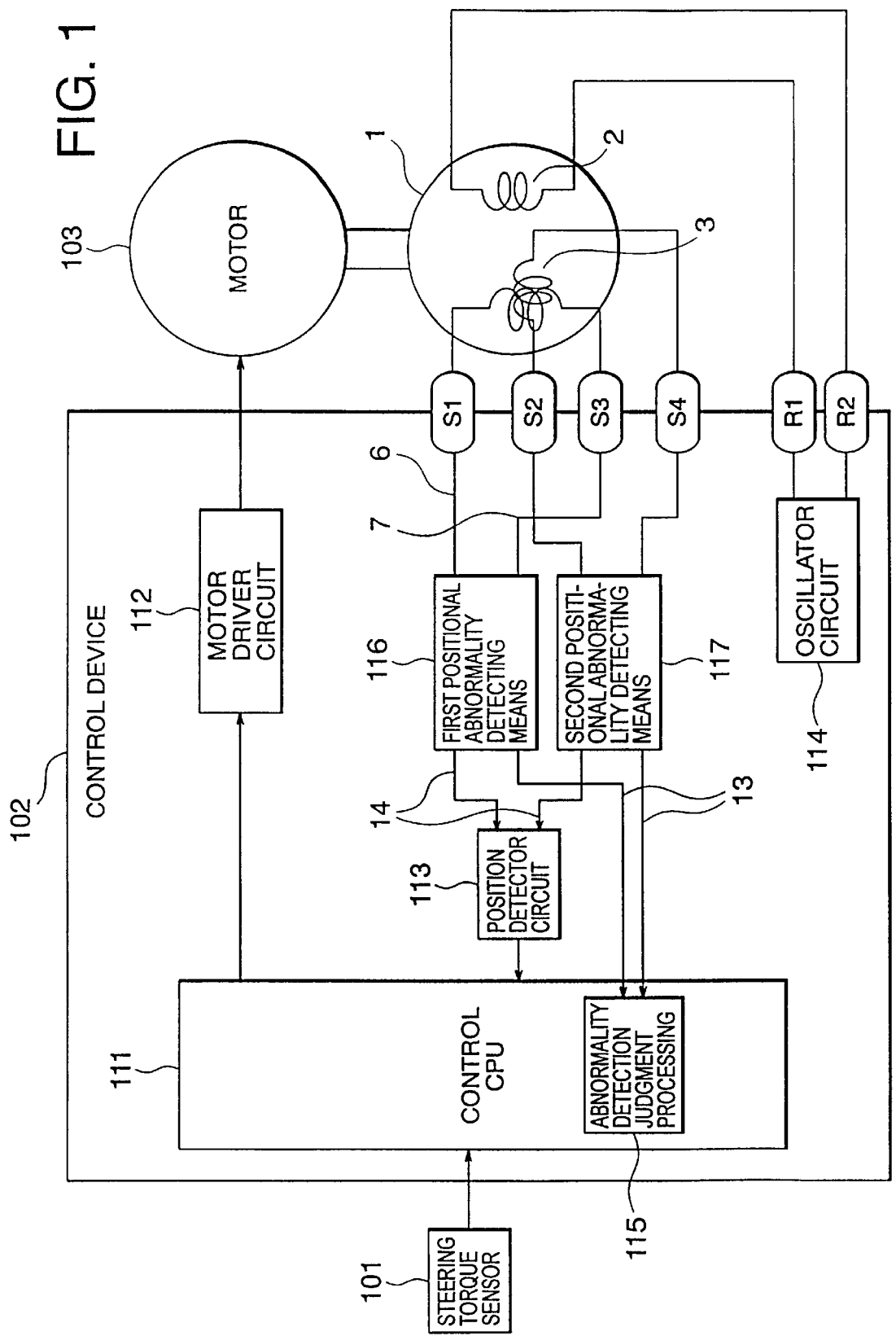
FIG. 1 is a block diagram of an electric power steering device in embodiment 1 of this invention.

FIG. 1 is a block diagram showing an electric power steering device in embodiment 1 of this invention.

The electric power steering device includes: a steering torque sensor 101 of detecting the steering effort of the driver; a brush-less motor 103 as a controlled object that assists the steering effort and is current-driven according to the rotational position or the rotational speed; a position sensor 1 of detecting the rotational position of this motor 103; and a control device 102 of controlling the motor 103.

The control device 102 has: a control CPU 111 as control means to which the detected output of the steering torque sensor 101 is inputted; a motor driver circuit 112 as driving means for driving the motor 103 on the basis of the output of this control CPU 111; an oscillator circuit 114 of generating a reference signal to the input winding of the position sensor 1 through terminals R1, R2; first positional abnormality detecting means 116 to which amplitude-modulated signals 6, 7 from the output winding 3 of the position sensor 1 are supplied through terminals S1, S3; second positional abnormality detecting means 117 to which the amplitude-modulated signals 6, 7 from the output winding 3 of the position sensor 1 are similarly supplied through terminals S2, S4; and a position detector circuit 113 as signal processing means that detects the position detecting signal 14 from the first positional abnormality detecting means 116 and the second positional abnormality detecting means 117, and supplies it to the control CPU 111.

Furthermore, the control device 102 contains an abnormality detection judgment processing part 115 as abnormality judging means to which the abnormality detection signal 13 from the first positional abnormality detecting means 116 and the second positional abnormality detecting means 117 is inputted. Furthermore, the first positional abnormality detecting means 116 and the second positional abnormality detecting means 117 compose DC signal detecting means.

Next, the operation will be described.

The control CPU 111 determines the assisting target torque according to the steering torque, and detects the rotational position of the motor by the signal from the position sensor 1, and determines the pattern to send the current corresponding to the target torque, according to the position of the motor, and outputs the current to the motor driver circuit 112. By sending the current from the motor driver circuit 112 to the motor 103, the turning force is given to the motor 103, and it becomes the assisting force at the time of steering. At this moment, by outputting a reference signal from the oscillator circuit 114, and by inputting it to the input winding 2 of the position detecting sensor 1, the amplitude-modulated signals 6, 7 including the positional information are outputted from the output winding 3 of the position sensor 1.

The first positional abnormality detecting means 116 divides the inputted amplitude-modulated signals 6, 7 into the position detecting signal 14 and the abnormality detecting signal 3, and outputs them. The second positional abnormality detecting means 117 also operates similarly. The position detecting signal 14 outputted from the first positional detecting means 116 is inputted into the position detector circuit 113, and the position detector circuit 113 supplies the detected positional signal to the control CPU 111. Furthermore, the abnormality detecting signal 13 outputted from the second positional abnormality detecting means 117 is inputted to the abnormality detection judgment processing part 115 in the control CPU 111.

Figure 2:
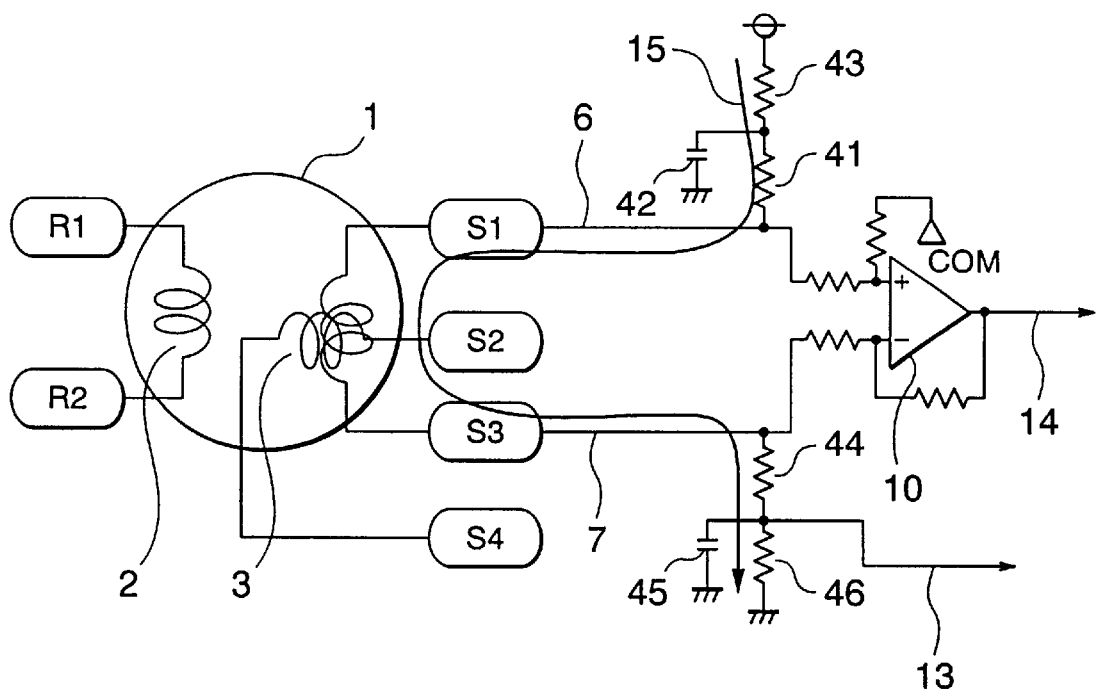
FIG. 2 is a circuit diagram showing embodiment 1 of this invention.

FIG. 2 is a circuit diagram showing one example of the first positional abnormality detecting means 116 as positional abnormality detecting means to which the output of the position sensor 1 is inputted.

In this drawing, the position sensor 1 made of the winding 2 for supplying a predetermined reference signal and performing excitation and the winding 3 to which the signal is outputted may be, for example, a well known resolver, or it may be a variable magnetic reluctance type position detecting device. Furthermore, it may be a linear position detecting device based on the similar principle. The output winding 3 of the position sensor 1 has a structure made of a pair because of the two-phase output, but here, the description will be given by the first positional abnormality detecting means 116 of any one phase, and as for the other second positional abnormality detecting means 117, the same effect can be obtained by composing that by the similar method. Furthermore, the mechanical parts such as a rotating trance for acting on the output winding 3 according to the reference signal will be omitted.

Both ends S1, S3 of the output winding 3 of the position sensor 1 by which the amplitude-modulated signals 6, 7 that are the winding output signals are obtained are connected to an operational amplifier through a pair of first and second resistances, and to the positive-phase terminal of this operational amplifier, a common terminal COM is connected through a third resistance, and to the negative-phase terminal, the output terminal of the operational amplifier is connected through a fourth resistance. The differential amplifier 10 is composed of the above described operational amplifier and each of the first to fourth resistances.

To the output side of this differential amplifier 10, an amplitude-modulated positional information signal expressed by sin θ×F(t) or cos θ×F(t) is outputted as a position detecting signal 14 according to the rotational position θ from the position sensor 1. Here, F(t) is a time function in synchronization with the period T of the reference signal, and for example, it is sin (2×π×t/T). As for the rotational position θ, a method where it is determined by performing a synchronous detection with the other phase output signal and by performing two-phase signal operation, or a method where it is determined by phase-shifting the other phase output signal and by converting the amplitude-modulated signal to be subjected to the addition and subtraction into a phase-modulated signal is considered.

Between the line of the winding output signal 6 and the ground, a resistance 41 and a capacitor 42 functioning as a filter are connected in series. Furthermore, the connecting point of the resistance 41 and the capacitor 42 is connected to the DC power source 12 through a resistance 43 as a first resistance. Furthermore, similarly, between the line of the winding output signal 7 and the ground, a resistance 44 and a capacitor 45 functioning as a filter are connected in series. Furthermore, the connecting point of the resistance 44 and the capacitor 45 is connected to the ground through a resistance 46 as a second resistance. Consequently, it is arranged that the bias current 15 flows through the passage that leads to the ground from the DC power source 12 through the resistance 43, the resistance 41, the line of the winding output signal 6, the output winding 3, the line of the winding output signal 7, the resistance 44, and the resistance 46.

This passage substantially composes bias current applying means, and it is possible to take out an abnormality detection signal that is a DC signal, by detecting the signal of the connecting point of the resistance 44, the resistance 46, and the capacitor 45 in this passage. At this moment, the respective relations may be properly determined, but if the relation of the respective resistances is made to be (R1=R2)>(R4=R5)>[resistance amount of the output winding] where the resistance value of the resistance 43 is R1, the resistance value of the resistance 46 is R2, the resistance value of the resistance 41 is R4, and the resistance value of the resistance 44 is R5, and if the relation of the respective capacitors is made to be C1=C2 where the capacitance of the capacitor 42 is C1 and the capacitance of the capacitor 45 is C2, the detection is accurately and easily performed, and it becomes difficult to give adverse effects on the modulated signal.

Next, the operation will be described.

First, the operation in the normal case will be described.

When a reference signal is supplied from the oscillator circuit 114 to the input winding 2 of the position sensor 1 to be excited, an amplitude-modulated signal sin θ×F(t) or cos θ×F(t) corresponding to the rotational position θ that is induced in the output winding 3 thereof is outputted through the differential amplifier 10 as a position detecting signal 14. The rotational position θ is detected by inputting this output into the position detector circuit 113.

Furthermore, as for the abnormality detecting signal 13, a DC signal made by combining the amplitude-modulated signal and the bias current is outputted. At this moment, if the values of the resistance 44 and the capacitor 45 are controlled, it becomes possible to eliminate the amplitude-modulated signal from the output winding 3 of the position sensor 1, and to take out only the bias signal. That is, a filter effect can be provided by the resistance 44 and the capacitor 45. Therefore, if a large filter time constant by which the periodic signal generated from the reference signal can sufficiently be eliminated is set so that for example, (R4·C1)=(R5·C2)>>T may be made, the amplitude-modulated signal is eliminated and only the bias current signal can be taken out, as the abnormality detecting signal 13.

Next, the operation at the abnormal time will be described.

At the time of abnormality such as breaking of the output winding 3 of the position sensor 1 or the like, the bias current 15 does not flow. Accordingly, in the abnormality detecting signal 13, only a signal made by filter-processing the amplitude-modulate signal by the resistance 44 and the capacitor 45 is outputted, and nothing is outputted in the abnormality detecting signal 13. Consequently, at this moment, the existence of abnormality is judged in such a way that the abnormality detecting signal 13 is A/D-converted by the A/D converter circuit (not shown), and is taken in the control CPU 111, and is compared with the reference value. Furthermore, it is also possible to judge abnormality by comparing the difference in the voltage of the abnormality detecting signal 13 with the reference value previously set in the well known comparator.

Accordingly, the judgment can be made by a simple comparator or taking-in of the interior of the computer that is the control CPU 111, when compared with the circuit structure shown in the above described Japanese Patent Laid-Open No. 2000-131096, and furthermore, the buffer circuit is unnecessary for the input to the position detector circuit 113. As mentioned above, the detection of the breaking of the wire can be performed with a simple structure and by an inexpensive method. When abnormality is judged, an instruction of stopping the motor drive is outputted to the motor driver circuit 102 from the control CPU 111, so that no turning force is given to the motor 103.

Figure 7:
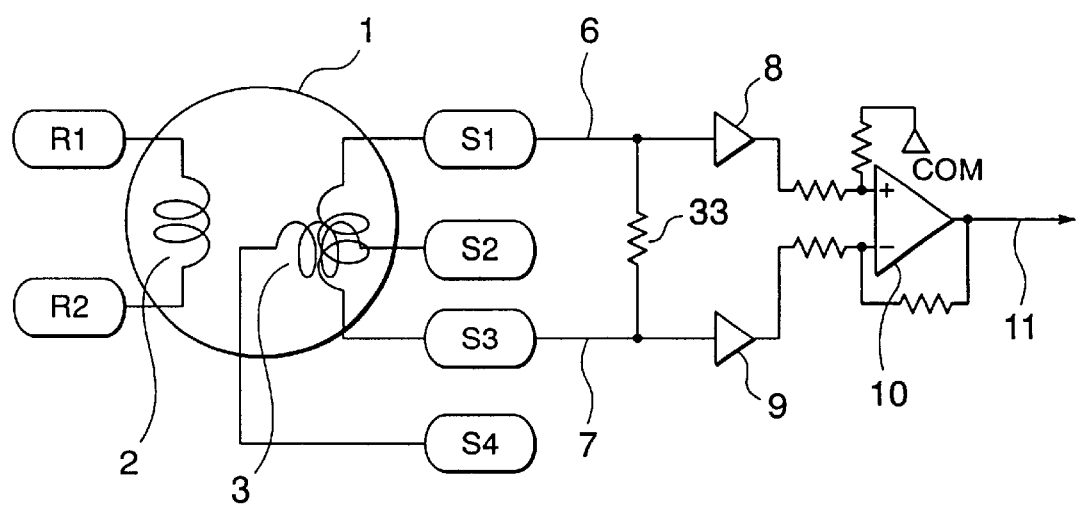
FIG. 7 is a circuit diagram for explaining the elimination of noise generated in the conventional output winding.

Furthermore, noise guided to the output winding 3 of the position sensor 1 or the signal transmission passage thereof from the outside depending on the environment of usage has a high frequency, and therefore, the resistances 41, 44 and the capacitors 42, 45 that are connected in series become a circuit equivalent to the resistance 33 in FIG. 7, as for the signal of the high frequency component. Therefore, it is possible to restrain the increase of unnecessary impedance in the high frequency area of the output winding part and to decrease the effect of noise coming from the outside by controlling the resistances 41, 44 and the capacitors 42, 45, Furthermore, in the above description, it is arranged that the abnormality detecting signal is taken out of the connecting point of the resistance 44, the resistance 46, and the capacitor 45 in this passage, but it is also possible to take the abnormality detecting signal out of the connecting point of the resistance 41, the resistance 43, and the capacitor 42, and the similar effect can be obtained.

Furthermore, in the above description, a winding output signal obtained at both ends S1, S3 of one phase of the output winding 3 of the position sensor 1 has been described, but it is possible to detect abnormality in both of the two phases of the output winding by applying the similar processing to both ends S2, S4 of the other phase of the output winding 3.

Furthermore, in the case of the above described electric power steering device, there is a time grace until the above described judgment of abnormality since it a device by which the driver steers, but judgment of abnormality must not be made wrongly. Therefore, the method of judging abnormality may be a method, where the judgment of abnormality is not made instantly when the abnormality detecting signal has a value other than a predetermined reference value, but the judgment of abnormality is made when a state where the abnormality detecting signal has a value other than the predetermined reference value continues, and the motor driving is stopped. Consequently, it can be arranged that no effect is received in the case where the state returns to the normal state immediately even if the abnormality detecting signal is wrong temporarily because of the effect of noise or the like.

Furthermore, although not shown, monitoring means for monitoring whether the desired control is faithfully performed or not by the control CPU 111 as control means may be provided separately from the control CPU 111, and the abnormality detecting signal based on the DC signal obtained by the positional abnormality detecting means 116, 117 may be directly inputted into the above described control means or monitoring means, and when the abnormality detecting signal is out of the predetermined range, it may be determined that the position detecting device is abnormal.

Embodiment 2

Furthermore, in the above described embodiment 1, a case where the filter constant is set so that the amplitude-modulated signal can be eliminated has been described as mentioned above, but among the position sensors, there are some in which the amplitude of the amplitude-modulated signal outputted from the output winding is small. In such a case, it is also possible to control the power source voltage of the DC power source 12 and the resistance value of each of the resistances 43, 46, 41, 44 so that the maximum voltage of only the amplitude-modulated signal is smaller than the voltage at the time when no amplitude-modulated signal is created and only the bias current flows, in the abnormality detecting signal.

At this moment, it is unnecessary to expect the filter effect based on the resistance 44 and the capacitor 45, and even if the amplitude-modulated signal is superposed on the abnormality detecting signal, there is no effect and the abnormality detection is possible. Furthermore, the degree of freedom in selecting each resistance and capacitor is improved, and the impedance of the output winding 3 of the position sensor 1 can be controlled regardless of the filter effect, and furthermore, low price can be attained in the selection of each of the resistances and capacitors by considering the cost.

Embodiment 3

Figure 3:
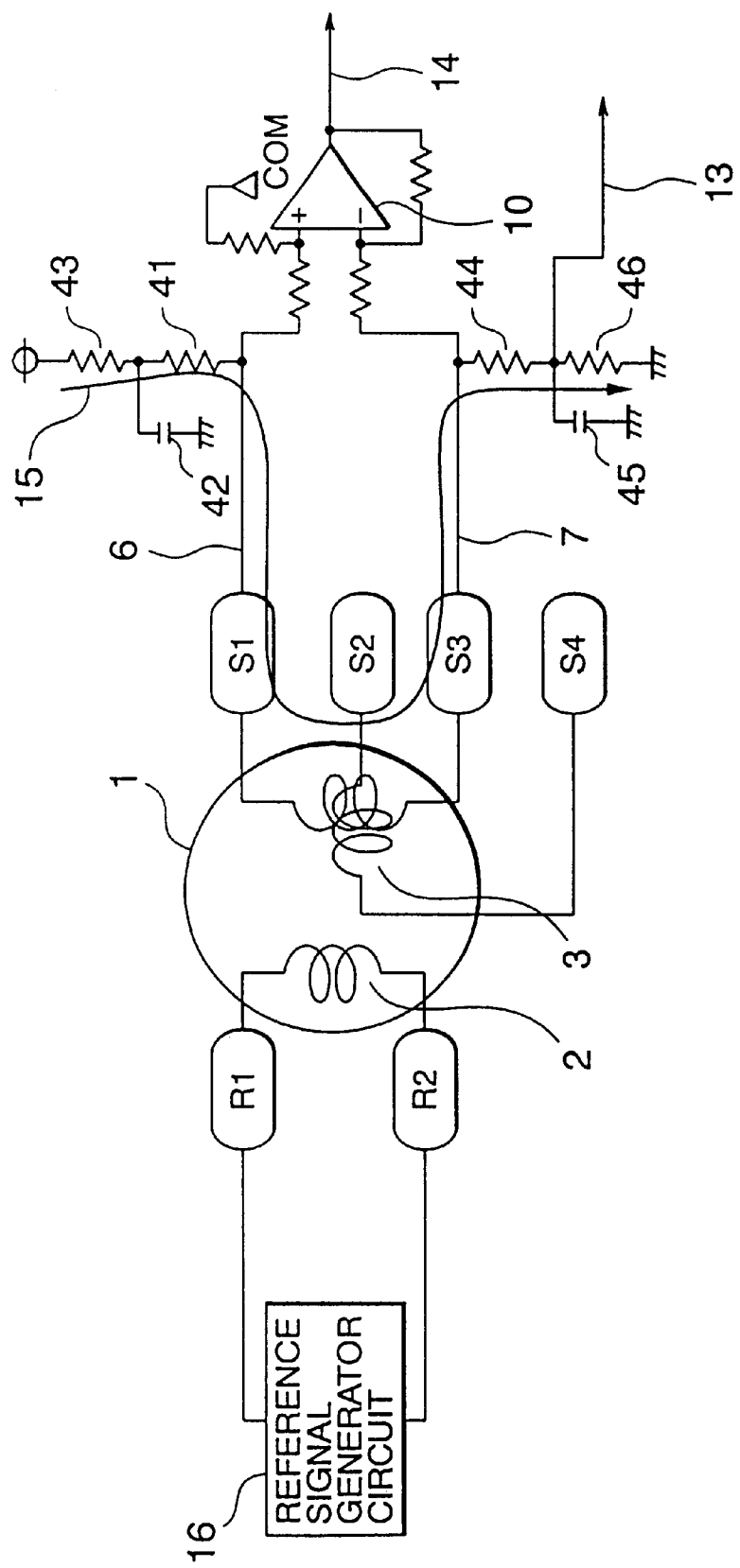
FIG. 3 is a circuit diagram showing embodiment 3 of this invention.

FIG. 3 is a circuit diagram showing embodiment 3 of this invention.

In this drawing, reference numeral 16 denotes a reference signal generator circuit as reference signal generating means that is provided at both ends of terminals R1, R2 of the input winding 12 of the position sensor 1 in place of the oscillator circuit 114 in FIG. 1. The rest of the structure is similar to that in FIG. 2.

In the above described embodiment 1, a case where a reference signal is given at all times has been described, but in the case where this invention is applied to a vehicle or the like, for example, in the case where the device is mounted as a device of detecting the rotational position of the motor of the above described electric power steering device, the position detecting device operates after the ignition switch has been turned on, and the positional detection starts.

At this moment, it is unnecessary to start instantly when the ignition switch is turned on, and there is some time grace for inspecting the device itself. In such a case, as shown in FIG. 3, it should be arranged that the reference signal generator circuit 16 is controlled, so that the reference signal is not generated immediately after the ignition switch has been turned on, and it is stopped, and the amplitude-modulated signal to be generated in the output winding 3 of the position sensor 1 is not generated. At this moment, a state where only the bias current 15 flows is made, and the abnormality detecting signal 13 can accurately perform only the detection of the bias current 15 without expecting the filter effect using the resistance 44 and the capacitor 45. After that, the reference signal generator circuit 16 is controlled to output the reference signal, after it has been judged that there is no abnormality.

Embodiment 4

Figure 4:
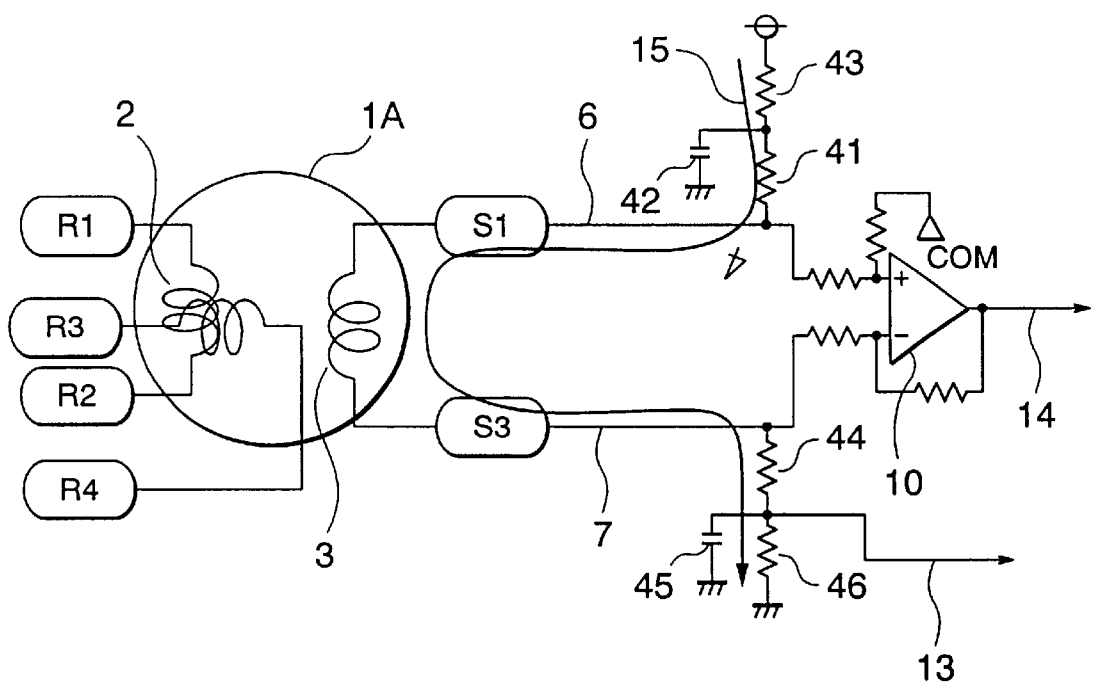
FIG. 4 is a circuit diagram showing embodiment 4 of this invention.
Figure 5:
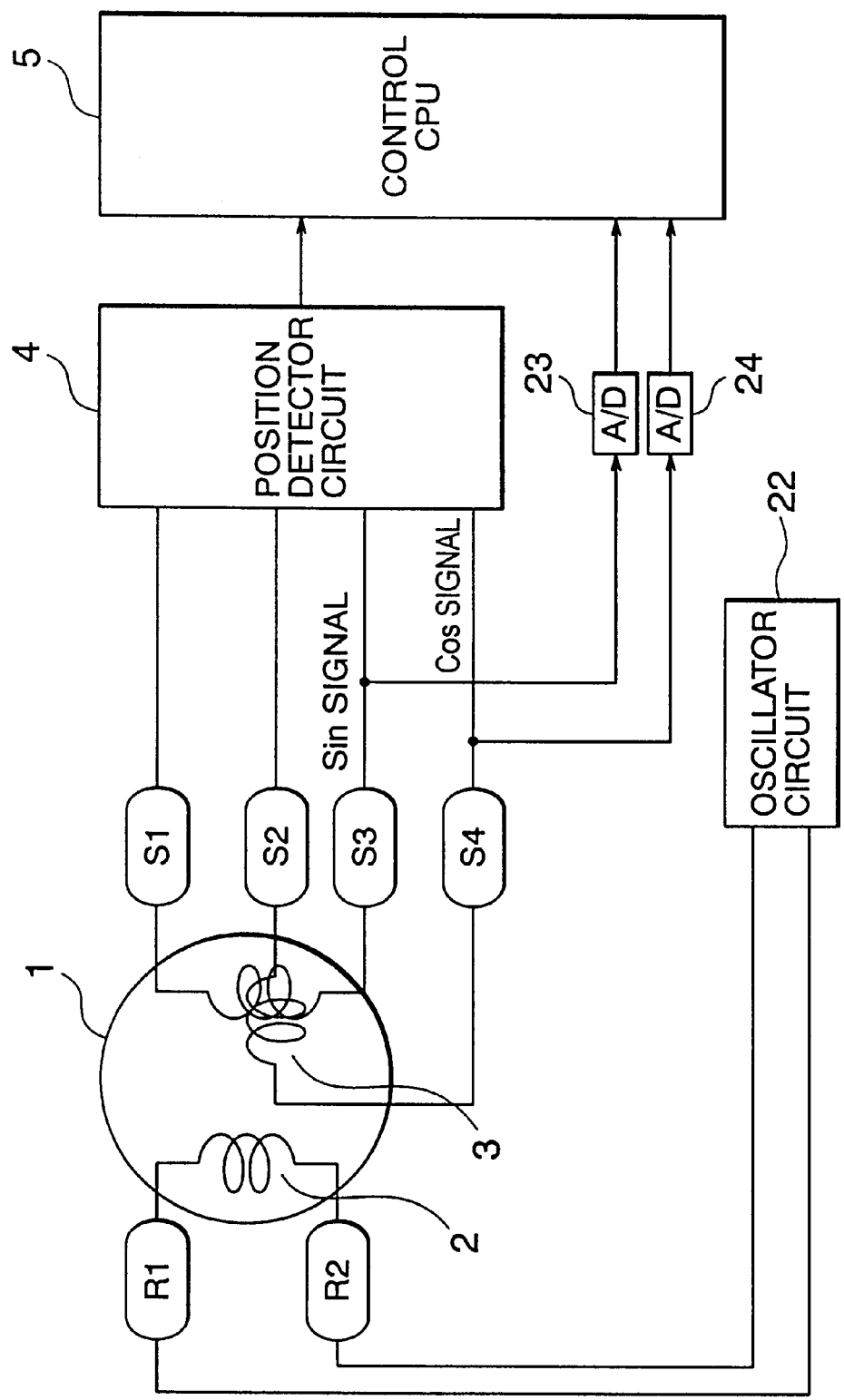
FIG. 5 is a block diagram for explaining a conventional abnormality detecting method.
Figure 6:
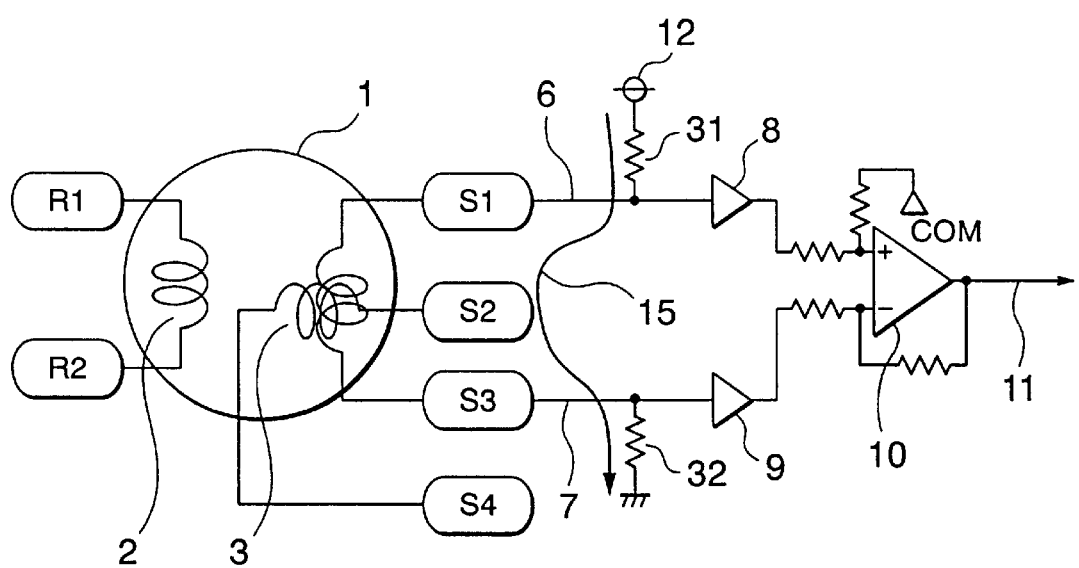
FIG. 6 is a circuit diagram for explaining a conventional abnormality detecting method that utilizes adding of bias current.

FIG. 4 is a circuit diagram showing embodiment 4 of this invention.

In this drawing, reference numeral 1A denotes a position sensor in which a two-phase reference signal is given to the input winding 12. The rest of the structure is similar to that in FIG. 2.

In the above described embodiment 1, a position sensor in which the reference signal is given to only one phase, and the amplitude-modulated signal induced from the output winding 3 is outputted has been described, but in the present embodiment, as shown in FIG. 4, a reference signal is supplied by two phase to the input winding 2 on the excitation side of the position sensor 1A by period T, that is, for example, $\sin(2\pi \times t/T) \times \alpha$ is given to the terminals R1, R2 and $\cos(2\pi \times t/T) \times \alpha$ is given to the terminals R3, R4, and a phase-modulated signal (for example, $\sin(2\pi \times t/T + \theta) \times \beta$) is obtained from the output winding 3.

In such a case, the above described abnormality detection is also possible. That is, an amplitude-modulated signal that has been the output of the output winding 3 of the position sensor 1A in the above described embodiment is replaced with a phase-modulated signal, and a signal made by adding the bias current to this is outputted as an abnormal detecting signal. In the normal case, a signal made by adding these phase-modulate signal and bias current is detected, but at the time of abnormality such as breaking of the wire, the bias current does not flow and only the phase-modulated signal appears in the abnormality detecting signal. By judging this, abnormality of the position detecting device can be judged.

What is claimed is:

1. An abnormality detecting method of a position detecting device which generates an amplitude-modulated or phase-modulated signal from a position sensor according to a rotational position of a rotor when a reference signal having a predetermined waveform is supplied, comprising:

applying a DC bias current to an output winding of said position sensor;

detecting a biased DC signal of an amplitude-modulated or phase-modulated signal applied to said output winding, apart from signal processing for detecting a rotational position of said rotor; and judging abnormality of said position detecting device from said detected DC signal.

2. The abnormality detecting method of a position detecting device according to claim 1, wherein detecting said DC signal includes eliminating an amplitude-modulated component or a phase-modulated component produced by noise and a reference signal.

3. The abnormality detecting method of a position detecting device according to claim 1, further comprising judging abnormality of said position detecting device from a DC signal depending on only said DC bias current, when said reference signal is not supplied.

4. The abnormality detecting method of a position device according to claim 1, wherein in judging abnormality, it is judged that said position detecting device is abnormal, when a state in which said DC signal is out of a predetermined range continues for a predetermined time.

5. An abnormality detecting device of a position detecting device which generates an amplitude-modulated or phase-modulated signal from a position sensor according to a rotational position of a rotor when a reference signal having a predetermined periodic waveform is supplied, comprising:

bias current applying means for applying a DC bias current to an output winding of said position sensor;

DC signal detecting means for detecting a biased DC signal of an amplitude-modulated or phase-modulated signal applied to said output winding, apart from signal processing means for detecting a rotational position of said rotor; and abnormality judging means for judging abnormality of said position detecting device from the DC signal detected by said DC signal detecting means.

6. The abnormality detecting device of a position detecting device according to claim 5, wherein said DC signal detecting means has a filter for eliminating an amplitude-modulated component or a phase-modulated component produced by noise and a reference signal.

7. The abnormality detecting device of a position detecting device according to claim 6, wherein said filter has a time constant larger than an oscillation period of said amplitude-modulated or phase-modulated signal.

8. The abnormality detecting device of a position detecting device according to claim 6, wherein said filter includes a resistance and a capacitor that are connected in series between both ends of said output winding and a ground, respectively.

9. The abnormality detecting device of a position detecting device according to claim 8, wherein said filter uses either the resistance or the capacitor that is connected in series between both ends of said output winding and the ground for abnormality detection.

10. The abnormality detecting device of a position detecting device according to claim 6, wherein said bias current applying means includes a passage that leads to a ground from a DC power source through a first resistance, one resistance of said filter, said output winding, another resistance of said filter, and a second resistance.

11. The abnormality detecting device of a position detecting device according to claim 10, wherein the amount of resistance included in the passage of said bias current applying means is set larger than the amount of resistance applied between said output winding.

12. The abnormality detecting device of a position detecting device according to claim 5, further comprising reference signal generating means for controlling generation of a reference signal, wherein said abnormality judging means judges abnormality of said position detecting device from a DC signal depending on only said DC bias current, when said reference signal is not supplied.

13. An electric power steering device comprising:

the abnormality detecting device of a position detecting device according to claim 5;

control means for controlling a controlled object including said rotor on the basis of a position signal outputted from said position detecting device; and monitoring means for monitoring the control operation of said control means, wherein an abnormality detecting signal based on the DC signal obtained by said abnormality detecting device is inputted directly to said control means or said monitoring means, and it is judged that said position detecting device is abnormal, when said abnormality detecting signal is out of a predetermined range.

14. The electric power steering device according to claim 13, wherein it is judged that said position detecting device is abnormal, when a state in which said DC signal is out of a predetermined range continues for a predetermined time.

15. The electric power steering device according to claim 13, wherein said controlled object is a motor for assisting the steering effort of a driver, and driving means for driving said motor is provided, and when it is judged from said abnormality detecting device that the position detecting device is abnormal, driving control of said motor is stopped, and driving of said motor is inhibited.

* * * * *